United States Patent
Crainic et al.

(10) Patent No.: US 7,942,479 B2
(45) Date of Patent: May 17, 2011

(54) COMBINED MANUAL RECLINE AND MANUAL LUMBAR ADJUSTMENT MECHANISM

(75) Inventors: Anton Crainic, Canton, MI (US); Kendrick Alden Harper, Temperance, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 170 days.

(21) Appl. No.: 11/946,179

(22) Filed: Nov. 28, 2007

(65) Prior Publication Data

US 2009/0134679 A1 May 28, 2009

(51) Int. Cl.
*B60N 2/00* (2006.01)
*A47C 7/14* (2006.01)

(52) U.S. Cl. ............ 297/354.12; 297/284.4; 297/378.12

(58) Field of Classification Search ............... 297/284.4, 297/378.12, 354.12
See application file for complete search history.

(56) References Cited

U.S. PATENT DOCUMENTS

| | | | |
|---|---|---|---|
| 2,550,831 A | 5/1951 | Lingenfelter | |
| 4,136,577 A * | 1/1979 | Borgersen | 74/479.01 |
| 4,550,750 A * | 11/1985 | Korth | 137/868 |
| 4,641,884 A * | 2/1987 | Miyashita et al. | 297/284.1 |
| 5,026,119 A | 6/1991 | Frank et al. | |
| 5,217,278 A * | 6/1993 | Harrison et al. | 297/284.7 |
| 5,641,205 A * | 6/1997 | Schmidt | 297/284.7 |
| 5,791,733 A * | 8/1998 | van Hekken et al. | 297/284.4 |
| 6,431,648 B1 | 8/2002 | Cosentino et al. | |
| 7,290,834 B2 * | 11/2007 | Christopher | 297/344.19 |
| 6,676,214 B2 | 3/2008 | McMillen et al. | |
| 2003/0122407 A1 | 7/2003 | Boyd et al. | |

* cited by examiner

*Primary Examiner* — Sarah B McPartlin
(74) *Attorney, Agent, or Firm* — Shook, Hardy & Bacon LLP

(57) ABSTRACT

A control device for regulating adjustment of vehicle seats is disclosed. The control device is a dual function control arm which combines the manual recliner and lumbar mechanism into a single handle. The handle is moved in a first direction to release the seat back recliner mechanism without affecting the lumbar adjustment mechanism. The same handle is moved in a second direction to actuate the lumbar adjustment mechanism without affecting the recliner mechanism.

20 Claims, 4 Drawing Sheets

COMBINED MANUAL RECLINE AND MANUAL LUMBAR ADJUSTMENT MECHANISM

TECHNICAL FIELD

The invention disclosed herein relates generally to control devices for regulating adjustment of vehicle seats. More particularly, the present invention relates to a dual function control arm that combines the manual recliner and lumbar mechanism into a single handle.

BACKGROUND OF THE INVENTION

In the early days of automotive vehicles the seats provided little comfort to the vehicle occupant. Early vehicle seat backs, in fact, did not use seat springs, but instead were only piled material covered with leather. Later seat backs used springs, but for many years only the seat style and type of covering material changed, with coil springs being used in automotive applications for decades.

Recognizing that many drivers required back support to compensate for back pain brought on through disease, injury or age, some auto seat suppliers began to offer specific types of focused back relief in the form of supplemental lumbar support. Some supports were adjustable by the user. These types of lumbar support mechanisms are embodied in fluid bladders that are connected to fluid pumps. The seat occupant can manipulate an inflator button to adjust the volume of fluid in the bladder.

Manufacturers also provided seats which are adjustable between a broad variety of different positions. This is particularly true with respect to the vehicle seat back which, while fixed in position in early vehicles, is able to move between a number of positions, from almost vertical to almost horizontal.

However, due to the increasing number of interior packaging constraints such as cup holders, map pockets, and side impact energy absorbers, manufacturers have found that additional seat travel and adjustment the packaging of both the manual recliner and the manual lumber handle is becoming more difficult.

Accordingly, a need exists today for an improved system for providing a mechanism for controlling both movement of the vehicle seat back as well as the lumbar mechanism on the vehicle seat.

SUMMARY OF THE INVENTION

A dual function recliner and lumbar control device is provided which overcomes the limitations associated with the prior art. The disclosed invention combines the functions of seat back control and lumbar control into one handle via a mechanism that allows both upward movement (the traditional back recliner release) and downward movement to actuate the manual lumbar mechanism. Movement of the handle in one direction to actuate one feature does not affect actuation of the other feature.

More particularly, the disclosed invention includes a seat back recliner device, a lumbar actuating device, and the control handle. A first link connects the control handle to the seat back recliner device while a second link connects the control handle to the lumbar actuating device.

Other features of the invention will become apparent when viewed in light of the detailed description of the preferred embodiment when taken in conjunction with the attached drawings and the appended claims.

BRIEF DESCRIPTION OF THE DRAWINGS

For a more complete understanding of this invention, reference should now be made to the embodiment illustrated in greater detail in the accompanying drawings and described below by way of examples of the invention wherein.

DETAILED DESCRIPTION OF THE PREFERRED EMBODIMENT

Figure 1:
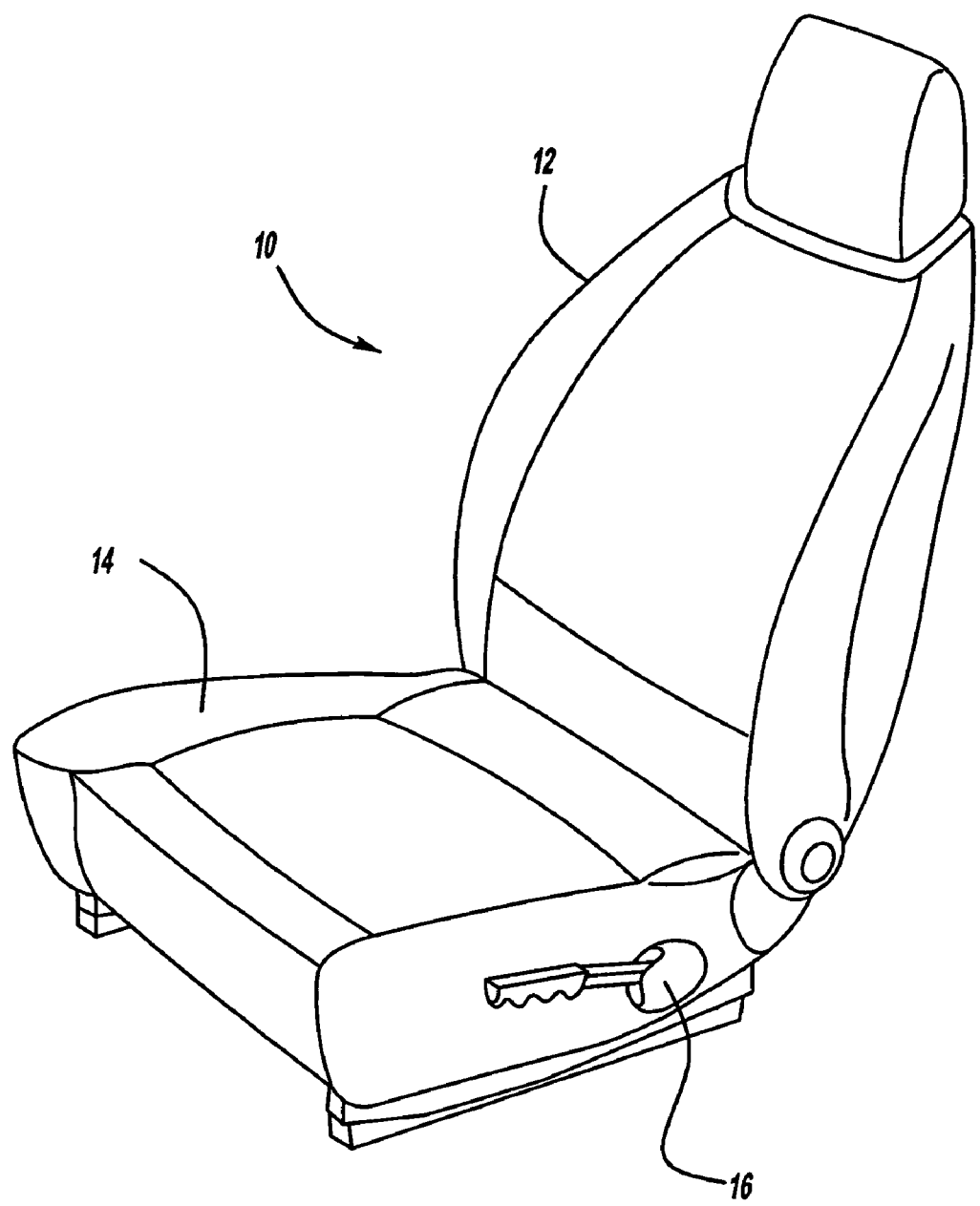
FIG. 1 illustrates a perspective view of a vehicle seat having the dual function manual recliner and lumbar handle of the disclosed invention.

In the following figures, the same reference numerals will be used to refer to the same components. In the following description, various operating parameters and components are described for one constructed embodiment. These specific parameters and components are included as examples and are not meant to be limiting.

Referring to the drawings and in particular to FIG. 1, a perspective view of a seat, generally illustrated as 10, is shown. The seat 10 includes a seat back 12, a seat base 14, and a control mechanism of the disclosed invention in the form of a dual action control arm 16. The configuration of the control arm 16 and its placement on the seat is shown for illustrative purposes and it is intended that neither the illustrated configuration nor the illustrated placement be deemed limiting. Furthermore, while the dual action control arm 16 is shown as being a mechanical device, it is possible that the dual action control arm 16 may be substituted by an electromechanical device in whole or in part. Again, the illustrated configuration and the following discussion is intended as being illustrative and not limiting.

Figure 3:
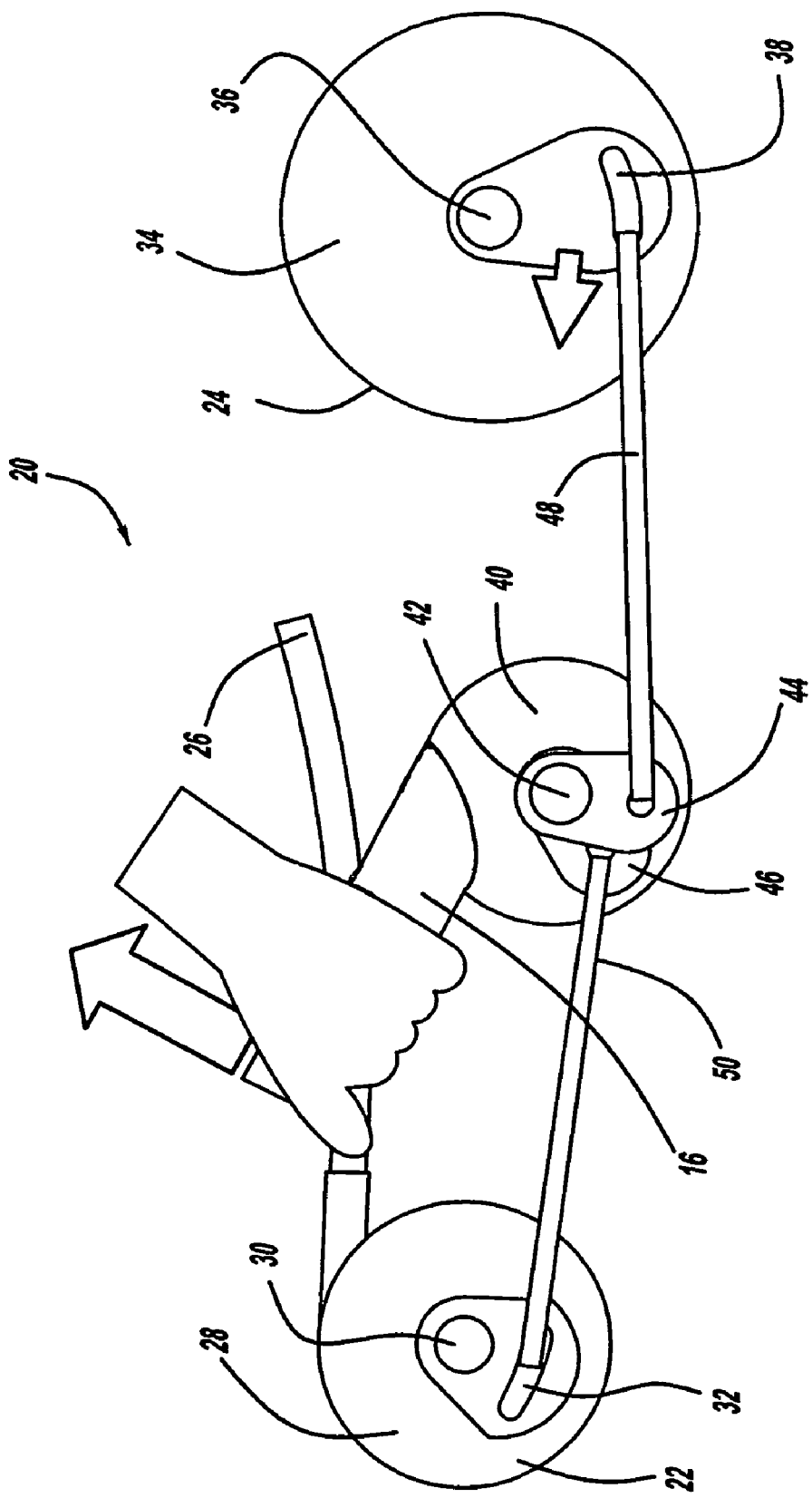
FIG. 3 is the same view as FIG. 2 but showing the handle moved in a first direction to release the seat back recliner mechanism.
Figure 4:
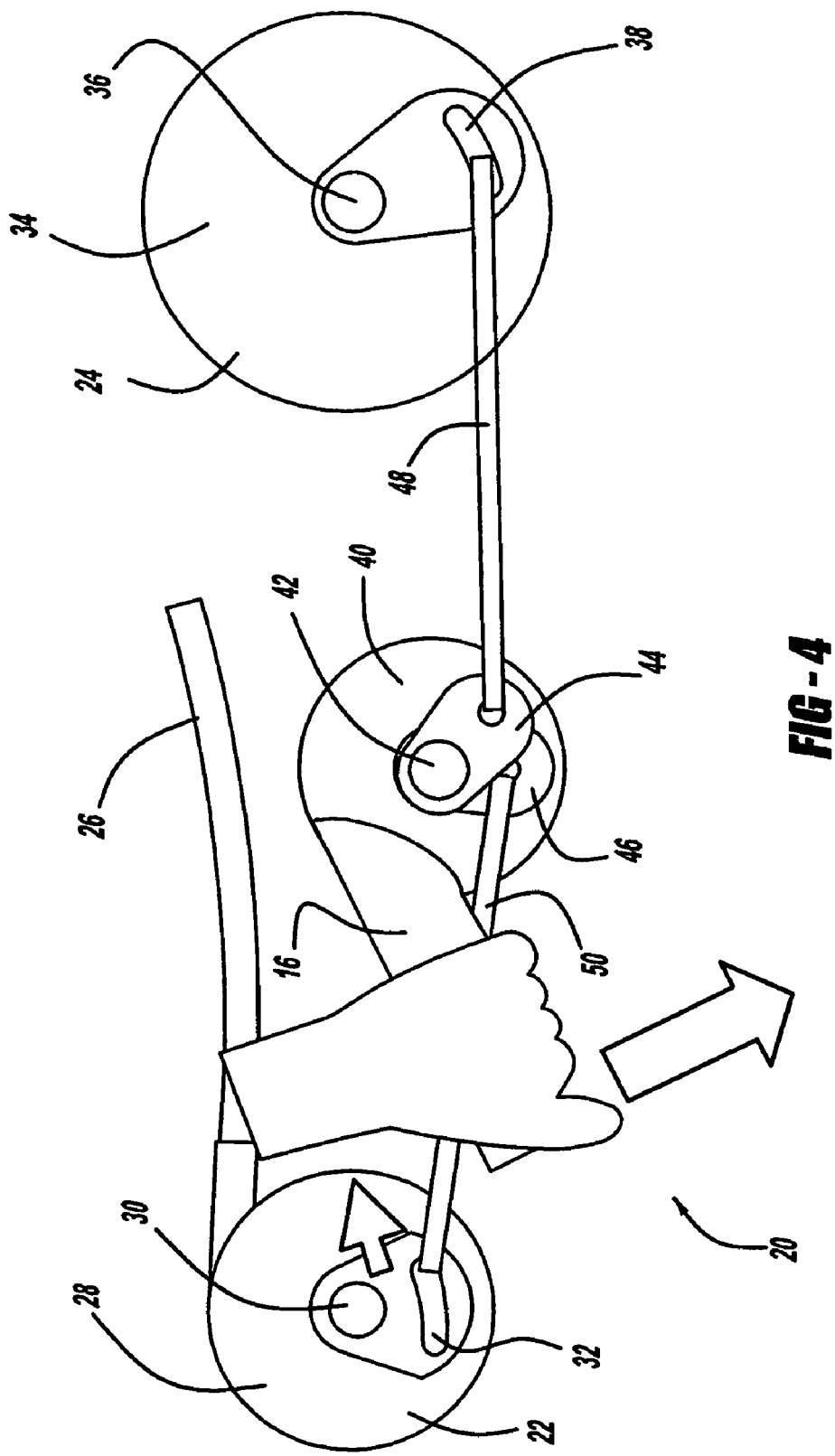
FIG. 4 is the same view as FIG. 2 but showing the handle moved in a second direction to actuate the lumbar mechanism.

The dual action control arm 16 is attached to a control mechanism which is substantially built into the seat base 14. The control mechanism can be seen in FIGS. 2 through 4 illustrating the resting position of the mechanism as well as its two actuation positions.

Figure 2:
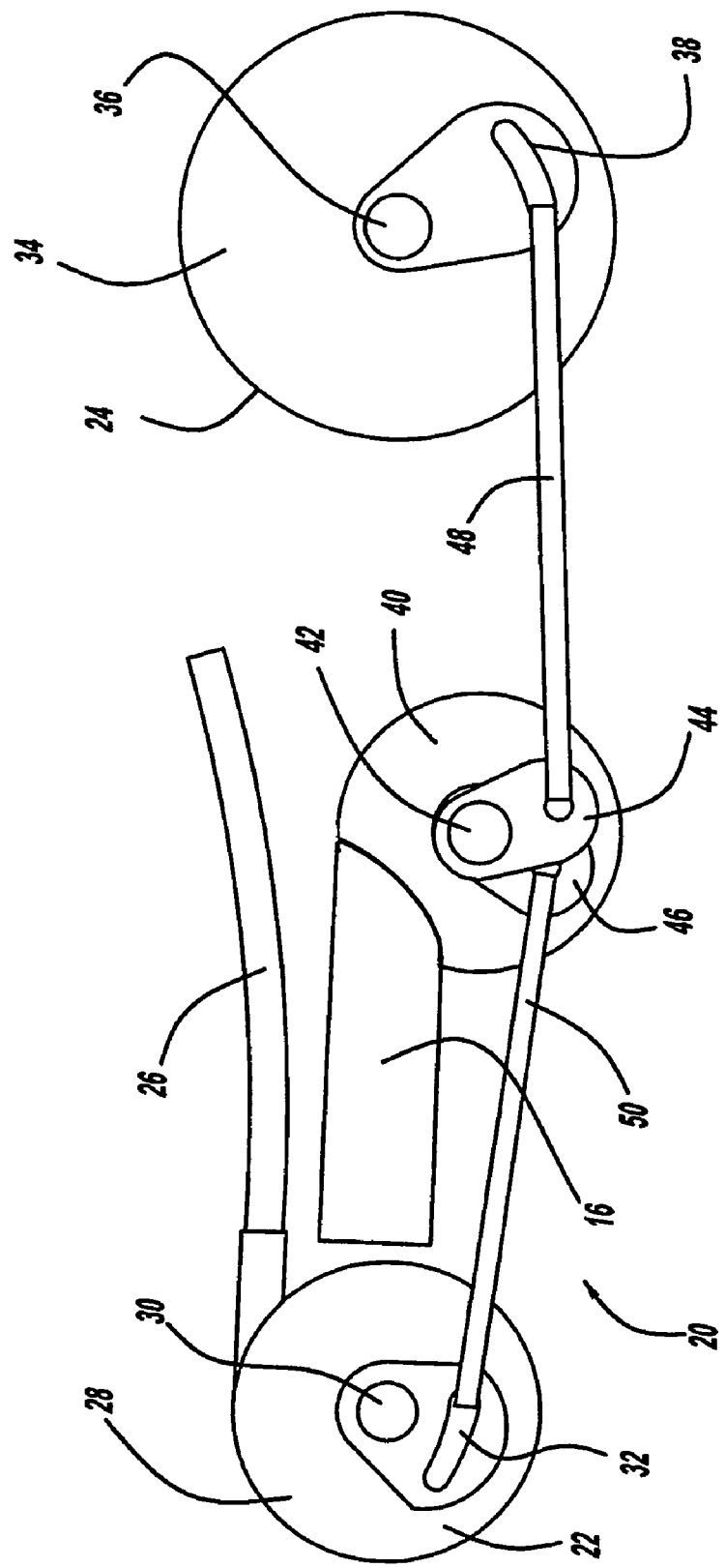
FIG. 2 is a diagrammatic side view of the dual function manual recliner and lumbar handle in its resting position.

With reference to FIG. 2, a control mechanism, generally illustrated as 20, is shown. The control mechanism 20 includes a lumbar actuator 22 and a seat back recliner release 24. The lumbar actuator 22 is preferably but not necessarily a uni-direction lumbar actuator. A cable 26 connects the lumbar actuator 22 and the lumbar mechanism built into the lower portion of the seat back 12 as is known in the art.

The lumbar actuator 22 includes a rotatable lumbar actuator body 28 that is pivotable on a pivot pin 30. A slot 32 is formed in relation to the rotatable lumbar actuator body 28.

The seat back recliner release 24 is preferably but not necessarily a rotary style seat back recliner device as is known in the art. The seat back recliner release 24 includes a rotatable recliner release body 34 that is pivotable on a pivot pin 36. A slot 38 is formed in relation to the rotatable recliner release body 34.

The dual action control arm 16 is attached to a rotatable control arm body 40. The rotatable control arm body is pivotable on a pivot pin 42. The rotatable control arm body 40 includes a first pivoting flange 44 and a second pivoting flange 46. The pivoting flanges 44 and 46 are rotatable with the rotatable control arm body 40.

A first link 48 is provided between the rotatable control arm body 40, to which it is pivotably attached at the first pivoting flange 44, and the slot 38 formed in the rotatable recliner release body 34. The end of the first link 48 is movable within the slot 38 as is understood in the art.

A second link 50 is provided between the rotatable control arm body 40, to which it is also pivotably attached at the second pivoting flange 46, and the slot 32 formed in the rotatable lumbar actuator body 28. The end of the second link 50 is movable within the slot 32 as is understood in the art.

The control mechanism 20 is illustrated in FIG. 2 in its resting position in which neither the lumbar actuator 22 nor the seat back recliner release 24 are actuated. In FIGS. 3 and 4 the dual action control arm 16 has been moved from its resting position of FIG. 2 to its actuation positions.

With reference first to FIG. 3, the operator has pulled upward on the dual action control arm 16, causing the rotatable control arm body 40 to rotate on the pivot 42. This action effects forward movement of the first pivoting flange 44 as well as the second pivoting flange 46 and the first link 48 is pulled forward (relative to the front of the vehicle). Because of the forward movement of the second pivoting flange 46 the second link 50 is also moved forward, but its motion has no impact on the rotatable lumbar actuator body 28 because the forward movement of the second link 50 is limited to movement within the slot 32 of the rotatable lumbar actuator body 28 and thus transmits no movement.

However, as the first link 48 is moved forward its movement in the slot 38 of the rotatable recliner release body 34 is restricted and thus causes the rotatable recliner release body 34 to rotate on the pivot pin 36. This rotation effects release of the seat back for adjustment by the occupant as is known in the art. Accordingly, upward movement of the dual action control arm 16 by the occupant results in the transfer of upward movement to release the seat back 12. Lumbar adjustment position is not affected.

With reference second to FIG. 4, the operator has pushed downward on the dual action control arm 16, again causing the rotatable control arm body 40 to rotate on the pivot 42 but in the direction opposite that shown in FIG. 3. This action effects rearward movement of the second pivoting flange 46 as well as the first pivoting flange 44 and the second link 50 is pulled backward. Because of the rearward movement of the first pivoting flange 44 the first link 48 is also moved rearward, but its motion has no impact on the rotatable recliner release body 34 because the rearward movement of the first link 48 is limited to movement within the slot 38 of the rotatable recliner release body 34 and thus transmits no movement.

However, as the second link 50 is moved rearward its movement in the slot 32 of the rotatable lumbar actuator body 28 is restricted and thus causes the rotatable lumbar actuator body 28 to rotate on the pivot pin 30. This rotation transfers linear motion via the cable 26 to the lumbar mechanism as is known in the art. Accordingly, downward movement of the dual action control arm 16 by the occupant results in the transfer of downward movement to adjust the lumbar mechanism. Seat back release is not affected.

While the invention has been described in connection with one or more embodiments, it is to be understood that the specific mechanisms and techniques which have been described are merely illustrative of the principles of the invention, numerous modifications may be made to the methods and apparatus described without departing from the spirit and scope of the invention as defined by the appended claims.

What is claimed is:

1. A seat for a vehicle comprising:
   a handle assembly movable between a first position and a second position, said assembly having a handle and a pivot pin;
   a first eccentric attached to said pin;
   a second eccentric attached to said pin;
   a first actuator being a seat back release mechanism;
   a second actuator being a lumbar actuator;
   a first link between said handle and said first actuator, said first link being attached to said first eccentric at a point spaced apart from said pivot pin; and
   a second link between said handle and said second actuator, said second link being attached to said second eccentric at a point spaced apart from said pivot pin,
   whereby movement of said handle to said first position actuates said first actuator while releasing tension on said second actuator and movement of said handle to said second position actuates said second actuator while releasing tension on said first actuator.

2. The seat for a vehicle of claim 1 wherein said handle is movable to a resting position where neither the said first actuator nor said second actuator is actuated.

3. A seat assembly for a vehicle having a seat back, a seat base, and a lumbar support element, the seat assembly comprising:
   a seat back recliner device;
   a lumbar actuating device;
   a control handle assembly including a pivot pin and a control handle having a body;
   a first eccentric attached to said pivot pin;
   a second eccentric attached to said pivot pin;
   a first link attached to said first eccentric at a point spaced apart from said pivot pin and connecting said first eccentric to said seat back recliner device; and
   a second link attached to said second eccentric at a point spaced apart from said pivot pin and connecting said second eccentric to said lumbar actuating device.

4. The seat assembly of claim 3 wherein said seat back recliner device includes a pivoting element, said pivoting element having a slot formed therein.

5. The seat assembly of claim 4 wherein said first link has a first end and a second end, said first end being pivotably connected to said control handle and said second end being movably fitted to said slot of said pivoting element of said seat back recliner device.

6. The seat assembly of claim 3 wherein said lumbar actuating device includes a pivoting element, said pivoting element having a slot formed therein.

7. The seat assembly of claim 6 wherein said second link has a first end and a second end, said first end being pivotably connected to said control handle and said second end being movably fitted to said slot of said pivoting element of said lumbar actuating device.

8. The seat assembly of claim 3 wherein said control handle includes a first pivotable flange and a second pivotable flange.

9. The seat assembly of claim 8 wherein said first link is pivotably attached to said first pivotable flange and said second link is pivotably attached to said second pivotable flange.

10. The seat assembly of claim 3 wherein said seat back recliner device includes a pivoting element having a first slot formed therein and wherein said first link is attached to said first slot and wherein said lumbar actuating device has a pivoting element having a second slot formed therein and wherein said second link is attached to said second slot.

11. The seat assembly of claim 10 wherein said control handle includes a first pivotable flange and a second pivotable flange and wherein said first link is pivotably attached to said first pivotable flange and said second link is pivotably attachable to said second pivotable flange.

12. The seat assembly of claim 11 wherein said first pivotable flange and said second pivotable flange are fixed to one another.

13. A recliner and lumbar control assembly for use with a vehicle seat having a seat back and a seat base, the control assembly comprising:
   a control handle assembly including a pivot pin and a control handle having a body; a first eccentric attached to said pin; a second eccentric attached to said pin;
   a seat back release mechanism;
   a lumbar actuator;
   a first link between said control handle and said seat back release mechanism, said first link being attached to said first eccentric at a point spaced apart from said pivot pin; and
   a second link between said control handle assembly and said lumbar actuator, said second link being attached to said second eccentric at a point spaced apart from said pivot pin, said first and second links being pivotably attached to said assembly at separate points spaced apart from each other and from said pivot pin.

14. The recliner and lumbar control assembly of claim 13 wherein said control handle is a dual function control handle that is movable between a first actuating position and a second actuating position.

15. The recliner and lumbar control assembly of claim 13 wherein said seat back recliner mechanism includes a pivoting element, said pivoting element having a slot formed therein and wherein said first link has a first end and a second end, said first end being pivotably connected to said control handle and said second end being movably fitted to said slot of said pivoting element of said seat back recliner mechanism.

16. The recliner and lumbar control assembly of claim 13 wherein said lumbar actuator includes a pivoting element, said pivoting element having a slot formed therein and wherein said second link has a first end and a second end, said first end being pivotably connected to said control handle and said second end being movably fitted to said slot of said pivoting element of said lumbar actuator.

17. The recliner and lumbar control assembly of claim 13 wherein said control handle includes a first pivotable flange and a second pivotable flange.

18. The recliner and lumbar control assembly of claim 17 wherein said first link is pivotably attached to said first pivotable flange and said second link is pivotably attached to said second pivotable flange.

19. The recliner and lumbar control assembly of claim 13 wherein said seat back release mechanism includes a pivoting element having a first slot formed therein and wherein said first link is attached to said first slot and wherein said lumbar actuator has a pivoting element having a second slot formed therein and wherein said second link is attached to said second slot.

20. The recliner and lumbar control assembly of claim 19 wherein said control handle includes a first pivotable flange and a second pivotable flange and wherein said first link is pivotably attached to said first pivotable flange and said second link is pivotably attachable to said second pivotable flange.

* * * * *